June 14, 1927.

A. W. HARRISON

VEHICLE

Filed March 22 1926

1,632,405

Inventor:
A. W. Harrison.
by Hazard and Miller
Attorneys.

Patented June 14, 1927.

1,632,405

UNITED STATES PATENT OFFICE.

ARTHUR W. HARRISON, OF LOS ANGELES, CALIFORNIA, ASSIGNOR OF ONE-HALF TO JOHN E. OSBORNE, OF LOS ANGELES, CALIFORNIA.

VEHICLE.

Application filed March 22, 1926. Serial No. 96,558.

My invention is a vehicle adapted to form a play article for children and to give them a certain amount of exercise and to allow propulsion of the vehicle by the upward and downward movement of the body of the child.

An object of my invention is to provide a vehicle having a spring supported seat, the seat being adapted to readily oscillate up and down due to the child alternately bearing a considerable portion of its weight on the seat and then a considerable portion of the weight on the feet so as to maintain a more or less continuous up and down swinging motion of the seat.

The motion of the seat transmits a rotary motion to the wheels, thus driving same in a forward direction; the vehicle being steered by a steering wheel having suitable handles.

A further object of my invention is to provide a type of seat with a driving connection to the axle so that by shifting the weight of the body on the seat it may be depressed to such a degree that the driving mechanism is thrown out of gear, thereby allowing free coasting.

A still further object of my invention is the construction of a three wheeled vehicle of the velocipede type with a seat supported on a single bent leaf spring and having a driving connection with the rear axle by means of a pawl and ratchet device, whereby a child bouncing up and down on the seat causes the pawl to engage the ratchet gear and rotate the wheels in a forward direction.

My invention will be more readily understood from the following description and drawings, in which.

Figure 1:
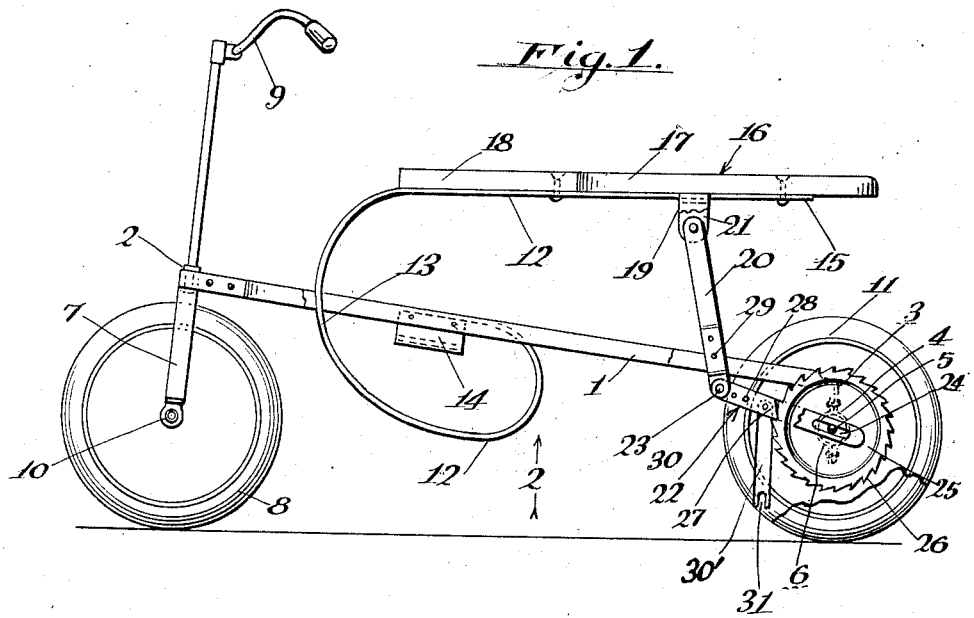
Figure 1 is a side elevation partly in section, showing in particular the arrangement for driving the rear wheels by means of a ratchet and pawl.

The framework of my vehicle is substantially as follows:

A pair of side bars 1 are bent around a steering post 2 at the forward end of the vehicle and at the rear end giving a downward bend 3 with a downwardly extending strap 4 passing around the rear axle 5. A plate 6 is bolted to the strap 4 and secures the rear axle in suitable bearings. The steering post is provided with forks 7 having a front wheel 8 suitably journaled therein and with steering handles 9. The fork 10 extends on each side of the wheel forming a foot rest for the child. The rear wheels 11 are rigidly attached to the axle which is rotatable.

The propelling arrangement for my vehicle is substantially as follows:

A substantial spring 12 having a curved front section 13 is rigidly attached to the plate 14 which extends between the two side bars; the spring preferably extending to a position substantially over the rear axle as indicated by the numeral 15 and having a board or the like forming a seat 16 secured to the spring. The seat may be of any suitable shape but is preferably rectangular in the rear portion 17 with a forward extension 18 of less width to allow the child's legs to extend forwardly on to the foot rests 10.

Figure 2:
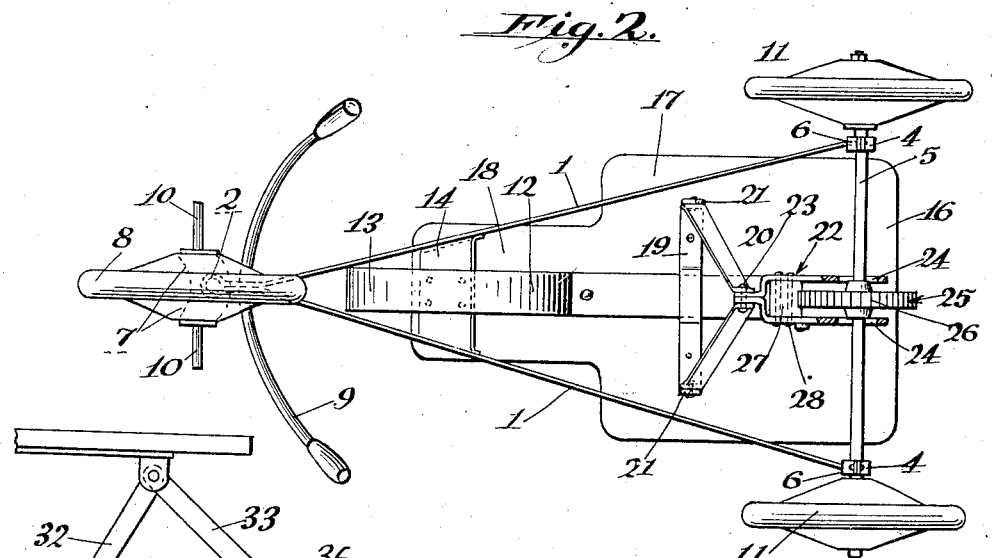
Fig. 2 is a bottom view of my vehicle taken in the direction of the arrow 2 of Fig. 1.

A bracket 19 is secured to the under surface of the seat and to the spring if desired and has pivotally connected thereto a pair of links 20. The bracket is shown as of considerable length between the ears 21 as clearly illustrated in Fig. 2, extending substantially the greater distance across the width of the seat.

A yoke 22 is pivotally connected to the links 20 by means of a pivot pin 23 and has a slot 24 through which the rear axle extends. A ratchet gear 25 of considerable diameter and having ratchet teeth 26 preferably of considerable size in reference to the diameter of the gear, is rigidly secured to the rear axle 5. A pawl 27 is secured between the members of the yoke and is rigidly secured thereby by bolts or rivets 28 or the like. The links 20 are preferably provided with a plurality of apertures 29 and the yoke with a plurality of apertures 30 so that the position of the pivot pin 23 may be altered.

The manner of actuation of my vehicle is substantially as follows:

It will be seen from the above construction that the yoke may have a slight backward and forward movement due to the sliding motion of the rear axle in the slot 24. When the child is seated on the seat the spring becomes compressed and allows a downward thrust on the links 20. This rotates the yoke 22 in an anti-clockwise direction as shown in Fig. 1, as well as thrusts the pawl firmly against the teeth of the ratchet gear. This action therefore rotates the wheels and drives the vehicle in a forward direction. Normally the child's weight will bring the seat to rest at some definite position and the vehicle would come to rest with the seat so depressed. However, to obtain a bouncing action the child may press on the foot rests 10 with the foot and pull on the handles 9 with the arms, thereby raising the body slightly and allowing the seat to spring up. This action causes the links to draw upwardly, swinging the yoke in an anti-clockwise direction, allowing it to ride over the ratchet teeth. The child may continue the up and down bouncing in any suitable manner or by pushing and pulling on the foot rests and handle, or by placing the feet on the ground in order to allow the seat to rise. In fact, any manner of securing the up and down motion to the seat will propel the vehicle forwardly.

If the child desires to coast, it may move back to near the rear end of the seat until its weight is sufficient to depress the seat to such an extent that the yoke is inclined in a forward and downward direction from the rear axle. In this position the pawl may be forced out of engagement with the ratchet teeth and allow free coasting. It is to be understood however, that in the normal operation the pawl readily rides over the teeth of the ratchet.

Should it be desirable to allow a child to use the vehicle as an indoor toy when it is not convenient to move it and to utilize same as a bouncing toy or seat, the pin 23 may be disconnected from the yoke so that the seat may bounce up and down without propelling the vehicle.

Although my vehicle is of a simple construction and has been illustrated as applied to a three wheeled vehicle, it will be apparent that the same type of driving arrangement could be applied to other types of children's vehicles or the like. Therefore it will be apparent that the features of my vehicle may be changed in general construction and in specific details to suit different circumstances. Such changes however, will be within the spirit of my invention as set forth in the description, drawings and claims.

The foot rest 10 of the fork 7 is formed by bending the fork upwardly at the axle and then bending a section outwardly to form a foot rest.

Another arrangement to allow coasting or to allow the seat to spring up and down without moving the vehicle is by providing a brace 30 pivotally connected on the yoke, the brace having a slot 31 in one end to be slipped over the rear axle 5. This brace is of such a length that when the axle fits in the groove 31 the pawl is forced out of engagement with the ratchet gear, thus allowing the seat to swing up and down without movement of the ratchet.

Figure 3:
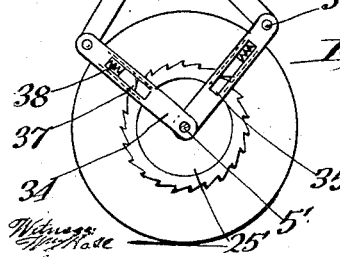
Fig. 3 shows a modified construction in which the axle is driven by both the up and down movement of the seat.

In Fig. 3, a pair of links 32 are pivotally connected to the bracket 19 and yokes 34 and 35 are connected by pivot pins 36 to the links 32 and 33. The ends of the yokes pivot on the rear axle 5 and do not have any slot to allow sliding. The pawls 37 are pressed by spring 38 into engagement with the ratchet gear 25. The operation of the arrangement of Fig. 3 is substantially as follows:

As the seat is depressed the pawl on the yoke engages the ratchet gear, rotating it in an anti-clockwise direction and hence driving the vehicle forwardly. At the same time the pawl in the yoke 35 rides freely over the ratchet teeth. On the upward movement the latter pawl engages the gear and rotates it in an anti-clockwise direction, the pawl in the yoke 34 riding freely over the teeth of the gear. Thus a forward propulsion to the vehicle is obtained on both the up and down motions of the seat.

Having described my invention, what I claim is:

1. A vehicle comprising in combination a framework, a driving axle having a plurality of wheels, a front axle having a steering wheel, a leaf spring attached to the frame, a seat mounted on the free end of the spring, a link connected to the seat, a ratchet gear attached to the driving axle, a yoke having slots with the driving axle extending through the said slots, a pivotal connection between the yoke and the link, and a pawl on the yoke engaging the ratchet.

2. A vehicle comprising in combination a V-shaped frame, a steering wheel operatively connected to the pointed part of the frame, a rear driving axle journaled in the rear part of the frame having driving wheels attached thereto, a spring connected to the front part of the frame, having a forwardly curved bend and a rearwardly extending portion, a seat attached to the spring, a link connected to the seat and depending downwardly therefrom, a ratchet gear connected to the rear axle, a yoke having a slot, the rear axle extending through the slot, a pivotal connection between the yoke and the link, and a pawl mounted on the yoke to operate the ratchet gear on the up and down movement of the seat.

3. A vehicle comprising in combination a framework, a driving axle having a plurality of wheels, a leaf spring attached to the frame, a seat mounted on the free end of the spring, a link connected to the seat, a ratchet gear attached to the driving axle, a yoke having slots with the driving axle extending through said slots, a pivotal connection between the yoke and the link, a pawl on the yoke engaging the ratchet, and a brace pivotally connected to the yoke having a slot adapted to slip over the axle, to force the pawl out of engagement with the ratchet.

In testimony whereof I have signed my name to this specification.

ARTHUR W. HARRISON.